United States Patent [19]

Benoît

[11] 4,450,364
[45] May 22, 1984

[54] LIGHTER THAN AIR WIND ENERGY CONVERSION SYSTEM UTILIZING A ROTATING ENVELOPE

[76] Inventor: William R. Benoît, 336 Pleasant St., Laconia, N.H. 03246

[21] Appl. No.: 361,176

[22] Filed: Mar. 24, 1982

[51] Int. Cl.³ .............................. F03D 9/00; F03D 1/04
[52] U.S. Cl. ........................................ 290/55; 290/44; 244/25; 416/84
[58] Field of Search ................... 290/2, 43, 44, 54, 55; 244/25, 33, 73; 416/84, 85, 86; 60/60

[56] References Cited

U.S. PATENT DOCUMENTS

| | | | |
|---|---|---|---|
| 1,717,552 | 6/1929 | Dunn | 244/25 |
| 2,384,893 | 9/1945 | Crook | 244/73 |
| 2,433,344 | 12/1947 | Crosby | 244/33 |
| 2,784,556 | 3/1957 | Perdue | 60/60 |
| 3,936,652 | 2/1976 | Levine | 290/2 |
| 4,073,516 | 2/1978 | Kling | 290/55 |
| 4,075,500 | 2/1978 | Oman et al. | 290/55 |
| 4,076,190 | 2/1978 | Lois | 290/55 X |
| 4,166,596 | 9/1979 | Mouton, Jr. et al. | 290/44 X |
| 4,168,439 | 9/1979 | Palma | 290/44 |
| 4,213,057 | 7/1980 | Are | 290/44 |
| 4,224,528 | 9/1980 | Argo | 290/44 X |
| 4,228,363 | 10/1980 | Jacobs et al. | 290/44 |
| 4,242,628 | 12/1980 | Mohan et al. | 290/44 X |
| 4,274,010 | 6/1981 | Lawson-Tancred | 290/44 X |
| 4,350,896 | 9/1982 | Benoit | 290/55 |
| 4,350,897 | 9/1982 | Benoit | 290/55 |
| 4,350,898 | 9/1982 | Benoit | 290/55 |
| 4,350,899 | 9/1982 | Benoit | 290/55 |
| 4,379,236 | 4/1983 | Inoue | 290/44 X |

*Primary Examiner*—J. V. Truhe
*Assistant Examiner*—Terry Flower
*Attorney, Agent, or Firm*—Robert P. Gibson; Anthony T. Lane; Saul Elbaum

[57] ABSTRACT

A lighter-than-air (LTA) wind energy conversion system (WECS) wherein the LTA envelope carries a main rotor and electrical generator to take advantage of high wind speeds available at high altitudes. The LTA envelope is adapted to rotate with the main rotor and is tethered to a ground based mooring system designed to provide self-orientation for the LTA envelope. In a preferred embodiment, a hollow bladed main rotor is provided at the midpoint of the rotating envelope. The rotor drives an induction turbine positioned within a substantially linear duct which is, in turn, preferably located along the longitudinal axis of the rotating LTA envelope. The output of the induction turbine is coupled to an electrical generator. In another embodiment, small wind-driven generators are positioned on the tips of the blades of the main rotor. The outputs of both embodiments are transmitted to the ground via the tethering system.

24 Claims, 4 Drawing Figures

U.S. Patent
May 22, 1984
4,450,364
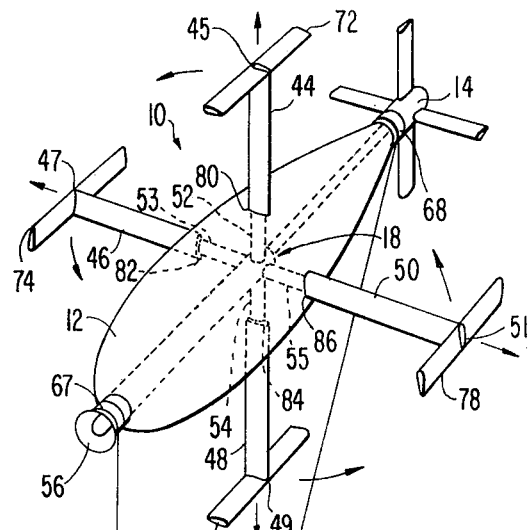
FIG.1
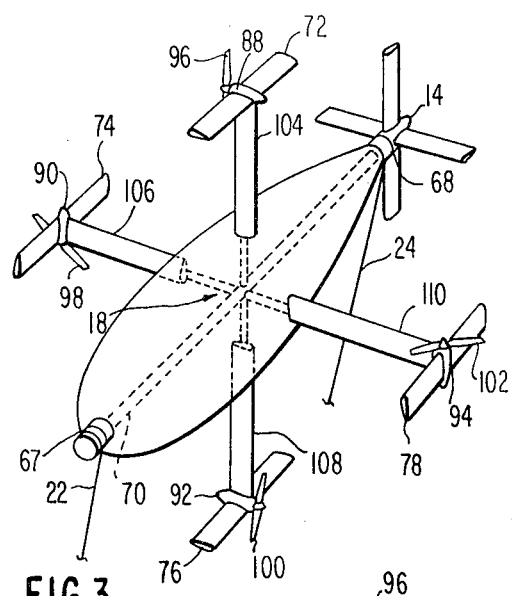
FIG.3
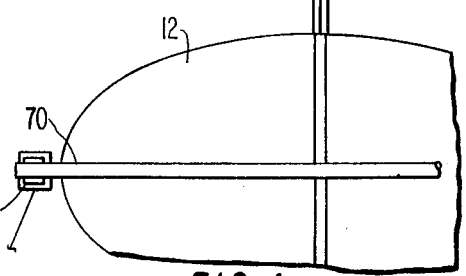
FIG.4
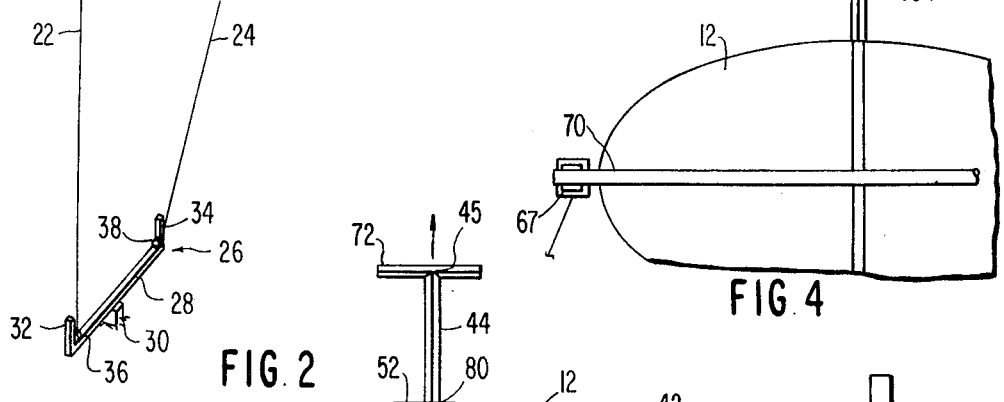
FIG.2
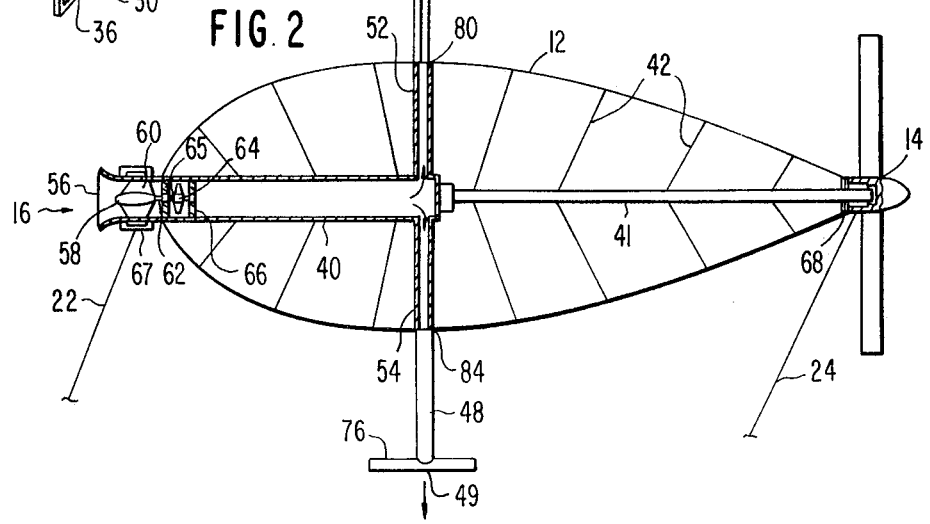

LIGHTER THAN AIR WIND ENERGY CONVERSION SYSTEM UTILIZING A ROTATING ENVELOPE

RIGHTS OF THE GOVERNMENT

The invention described herein may be manufactured, used, and licensed by or for the United States government for governmental purposes without the payment to me of any royalty thereon.

BACKGROUND OF THE INVENTION

1. Field of the Invention

The present invention is related to wind energy conversion systems and, more particularly, is directed towards a wind energy conversion system which is carried aloft by a lighter-than-air structure.

2. Description of the Related Art

The advent of fossil fuel shortages has stimulated the development of alternative energy sources, and in certain regions of the world wind energy conversion systems (WECS) are becoming more efficient and competitive in generating large amounts of electricity for residential or commercial use. Commercial versions of a WECS traditionally consist of a wind-driven rotor coupled to an electrical generator which are mounted on a tower to raise the large diameter rotor off the ground and as high in the wind regime as economically possible.

The major challenges to a designer of a WECS are the dilute concentration of energy in the wind as well as the intermittent nature of the wind. The lower power density of wind dictates that WECS of large size are required if sizable amounts of electrical power are to be generated. The intermittent nature of the wind normally results in the rendering of a WECS in an idle state much of the time. This has resulted in granting wind-generated electricity a value equal only to the fossil or nuclear fuel displaced with relatively little value granted for the capital equipment. This has seriously retarded commercial WECS development.

In addition, since the wind spectrum contains gusts and lulls, the stresses introduced into the rotor system of a WECS are large, and require rotor designs and support structures which are, to say the least, quite a challenge to the designer.

Since the power contained in the wind is a function of the cube of the velocity, the siting of a WECS becomes extremely important. Thus far, the best sites for a ground-based WECS have been on the coastlines in the northern hemisphere, as well as on mountain tops and hill tops. The latter elevations replace the high towers required to position the wind-driven rotor high enough to benefit from the velocity gradient of the wind. Unfortunately, the availability of prime high-altitude sites is severely limited, and although the cost of tower construction is greatly reduced for such sites, the expenses of road building, transporting the heavy components and subsequent erection of the WECS are high.

It is generally considered that WECS must be placed beyond the boundary layer portion of the wind in order to become inexpensive in terms of the energy yields. Additionally, a WECS must be designed to afford maximum protection against violent storms, which in the past have been primarily responsible for wind machine breakdown or destruction.

In addition to the inherent high cost attendant to the construction of a tower of sufficient height to position a large diameter (e.g., 300 foot) rotor, ground-based towers suffer from several other deficiencies. One deficiency is that there is a requirement for an open approach to the tower location, which leads to the desirability of utilizing high altitude, but relatively inaccessible, bald hills for placement of a WECS tower. Further, construction of a tower necessarily results in a fixed height for the main rotor whose electrical generating capability is therefore at the particular height at any given point in time. Further, undesirable vibrations have been observed which result from what is referred to as "tower shadow" which occurs when the blade of the rotor passes adjacent the tower and sets up a type of vibratory forcing function effect. Additionally, there are inherent energy losses due to tower drag, and it is difficult to erect, service and maintain the equipment positioned on the top of the tower.

Due to the gravity loads, there presently exists a practical maximum limit for the rotor diameter of approximately 300 feet. Further, a WECS having a 300 foot diameter rotor that produces 2.5 megawatts of electricity presently costs approximately $14 million and includes a massive transmission, drive shaft and heavy bearings which add significantly to the cost of the WECS as well as complicate the tower design upon which such a massive system must be positioned. For example, a mechanical transmission required for a 300 foot diameter rotor would weigh approximately 150–200 tons.

In addition to the foregoing drawbacks, a conventional WECS requires yaw motors, bull rings and the like, to turn the main rotor as the wind shifts direction. Such yaw motors and associated controls are expensive for large diameter rotors, must be operated at a slow rate in order to reduce gyroscopic loads, and add to maintenance and servicing problems.

There is a type of WECS which is known to obviate the need for a mechanical transmission. Such a WECS is known in the art as an Enfield-Andreau wind machine (see page 18 of "Wind Machines" by Frank R. Eldridge, The Mitre Corporation, October 1975). The Enfield-Andreau wind machine operates on a depression principle wherein the blades of the propeller are hollow and are provided with apertures at their tips.

Generally, the interior of the blades communicate through an air passage in the hub of the propeller with the outlet of an air turbine which is coupled to an electric generator. When the wind velocity is of a value sufficient to cause rotation of the propeller, the air within the hollow blades is induced, by reason of the centrifugal force generated by its own mass, to flow out through the apertures in the blade tips thereby forming a depression (i.e., a pressure lower than that of the surrounding atmosphere) within the hollow blades. The air within the air turbine is then at a higher pressure than that of the air remaining within the blades, therefore establishing a continuous flow of air through the air turbine, the hub, the interiors of the blades and out through the apertures at the tips. The flow of air through the air turbine supplies power to drive the electric generator. A typical Enfield-Andreau WECS is set forth, for example, in U.S. Pat. No. 2,784,556 to Perdue. Such a ground-based system, however, still requires the propeller hub to be capable of rotation about a vertical axis in order that it may face into the wind. Additionally, a conventional Enfield-Andreau WECS requires the incoming air to make at least three 90° turns prior to expulsion through the propeller tips. Such a system inherently loses energy that it otherwise might have. Further, a ground-based Enfield-Andreau WECS suffers from the same deficiency set forth above with respect to other WECS, namely, the inability to take advantage of the high wind power densities found at considerable altitudes off the ground.

I am also aware of U.S. Pat. No. 4,073,516 which issued Feb. 14, 1978 to Kling. In this patent, the advantage of replacing a tower-based WECS with a gas-filled hollow body that carries a rotor assembly, current generator and alignment means is recognized. However, the apparatus disclosed in this patent for accomplishing these noteworthy objectives are complex. Initially, the system requires an alignment assembly for aligning the rotor to face into the wind, a ground anchor, and at least one captivating stay connecting the floating power plant to the anchor. The support body is connected to the captivating stay through a joint connection requiring three degrees of freedom. The rotors are gimbal-mounted at a variable relative position with respect to the support body but in fixed positions relative to one another. Additionally, the rotor assembly requires at least one pair of coaxially and coplanarly mounted counter-rotating rotors having their moments of momentum compensated. Again, while this patent does recognize the noteworthy advantage of elevating a wind-driven power plant into high-altitude winds by means of a lighter-than-air structure, the means for accomplishing same, it is felt, leaves much to be desired and may be impractical.

In my several co-pending U.S. patent applications (U.S. Ser. Nos. 200,103; 200,104; 200,105 and 200,106 filed Oct. 24, 1980, which have each issued, on Sept. 24, 1982, as U.S. Patents (U.S. Pat Nos. 4,350,896; 4,350,897; 4,350,898 and 4,350,899, respectively)), I have provided lighter-than-air wind energy conversion systems having main rotors that rotate independently of the gas-filled structures. While they are improvements over the prior art, such systems require large, heavy rotor blades. With the rotor fully exposed to the wind, the entire length of each blade must be aerodynamically shaped. Manufacturing such blades accounts for a great expense in the production of a WECS.

One pending U.S. patent application (U.S. Ser. No. 200,103) discloses a hollow-bladed main rotor mounted on bearings attached to a non-rotating duct. Opening a passageway for air flow between the duct and the rotor requires expensive seals and usually results in an efficiency loss since the air flow path must be altered at some point.

It is towards achieving a general increase in efficiency in an LTA-WECS that the present invention is advanced.

I am also aware of the following U.S. Pat. Nos. 1,717,552; 2,384,893; 2,433,344; and 3,936,652.

OBJECTS OF THE INVENTION

It is therefore a primary object of the present invention to provide a wind energy conversion system (WECS) which is coupled to a lighter-than-air (LTA) structure for taking advantage of high energy density winds at high altitudes in a more efficient and economical manner than heretofore possible.

Another general object of the present invention is to provide a wind energy conversion system which overcomes the disadvantages and deficiencies noted above with respect to prior art WECS.

A further general object of the present invention is to provide a wind energy conversion system which totally eliminates the complications associated with ground-based systems, including those associated with tower structure and cost.

An additional object of the present invention is to provide a wind energy conversion system which permits withdrawal of the system from the wind regime prior to the advent of a storm in order to protect the system against damage.

An additional object of the present invention is to provide a WECS which may be positioned in any desirable location, such as in a valley, off-shore, in marshland, and other locations heretofore thought inappropriate for an efficient WECS.

Another object of the present invention is to provide a WECS in combination with a lighter-than-air structure which is self-orienting and includes aerodynamic damping of orientation motions.

An additional general object of the present invention is to provide a wind energy conversion system which is much more efficient and hence more economical than prior art systems, which greatly reduces stresses impinging on the rotor, and which is relatively easy to erect, maintain and service when compared to a ground-based WECS.

An additional object of the present invention is to provide a WECS which requires very little site preparation, has little impact on the environment, is virtually pollution-free, noise-free and is visually unobjectionable.

A further important object of the present invention is to provide an airborne WECS which eliminates the need for a mechanical transmission and thereby greatly reduces the weight of the system required to be airborne.

Another important object of the present invention is to provide an LTA-WECS which can produce, for example, the same amount of electricity with a rotor of one-fourth the size of a ground-based WECS, or can achieve four times the power as may be obtained for the same size rotor on a tower-based WECS.

A still further object of the present invention is to provide an LTA-WECS which improves efficiency compared to my prior designs.

SUMMARY OF THE INVENTION

The foregoing and other objects are attained in accordance with one aspect of the present invention through the provision of apparatus which comprises a lighter-than-air structure including an enclosed rotating gas-filled envelope and means supported by the lighter-than-air structure for generating electricity. Such means includes a main rotor having a plurality of rotor blades adapted to be rotated by the wind in a plane substantially perpendicular to the longitudinal axis of the structure.

The apparatus further comprises a non-rotating tail for orienting the structure and means for producing additional lift consisting of wings located on the rotor blades in positions substantially parallel to the longitudinal axis of the structure. Means are preferably connected between the lighter-than-air structure and the ground for tethering the structure and for delivering electricity.

In accordance with more specific aspects of a preferred embodiment of the present invention, the main rotor includes at least one hollow rotor blade having an air inlet and an air outlet. The system further includes duct means for coupling the air inlet of the hollow rotor blade to the turbine, the latter preferably being positioned within the duct means. More particularly, the duct means includes an open front end and a rear end, the air inlet of the main rotor coupled to the rear end while the hollow rotor blade is adapted, upon rotation, to draw air through the open front end of the duct means. The turbine preferably includes impeller blade means adapted to be rotated by the air drawn through the open front end of the duct means. The electrical generator may be positioned forwardly of the turbine.

The duct means preferably comprises a substantially linear duct from the front end to the rear end thereof. The duct is positioned within the lighter-than-air structure substantially along the longitudinal axis thereof. The open front end of the duct comprises a ram air inlet.

In an alternate embodiment, the means for generating electricity comprises generators positioned on the rotor blades. Such means further comprises a support spar extending longitudinally through the envelope and radial spar means. The radial spar means include a periphery connected to the rotor blades and a hub connected to the support spar.

In accordance with other aspects of all embodiments of the present invention, the means connected between the LTA structure and the ground preferably comprises at least one tethering cable means and at least one electrical cable means. Preferably provided on the ground are means for mooring the cable means which includes means for selectively drawing in the cable means and thereby tethering the structure closer to the ground. More particularly, the cable means include at least two cables, one of which is connected to the fore portion of the structure, the mooring means including a beam which is pivotally coupled to a support pedestal and includes a cable connected preferably through a winch to each end thereof. In the LTA-WECS, the cables are connected to bearings at the fore and aft ends of the envelope.

BRIEF DESCRIPTION OF THE DRAWINGS

The foregoing and other objects, aspects, uses and advantages of the present invention will become more fully appreciated as the same becomes better understood from the following detailed description of the present invention when considered in connection with the accompanying drawings, in which:

FIG. 1 is a perspective view of a preferred embodiment of the present invention;

FIG. 2 is a longitudinal sectional view of the lighter-than-air structure of FIG. 1;

FIG. 3 is a perspective view of an alternate embodiment to that illustrated in FIG. 1; and FIG. 4 is a broken sectional view of the forward portion of the structure of FIG. 3.

DETAILED DESCRIPTION OF THE PREFERRED EMBODIMENTS

Referring now to the drawings, wherein like reference numerals represent identical or corresponding parts throughout the several views, and more particularly to FIG. 1 thereof, reference numeral 10 indicates generally a preferred embodiment of a lighter-than-air wind energy conversion system (LTA-WECS) of the present invention.

The LTA-WECS 10 includes a lighter-than-air envelope 12 which may be made of a rigid construction or of a flexible material such as a rubberized fabric of suitable properties on a rigid structure. A flexible construction reduces stresses, but may exhibit slightly higher drag than a rigid construction. Located in the middle portion of the envelope 12 is a wind-driven main rotor 18 coupled to cause rotation of the lighter-than-air envelope 12. The details of construction of the rotor 18 will be described hereinafter.

Shown positioned in the fore portion of envelope 12 is a generator structure which is indicated generally by reference numeral 16 (FIG. 2) and will be described in greater detail hereinafter.

A non-rotating tail 14 is mounted on the rear portion of the envelope 12 for orientation purposes.

At the longitudinal ends of envelope 12 are a pair of housings 67 and 68 for standard-type bearings, either roller or ball, which allow the envelope 12 to rotate while the housings 67 and 68 remain stationary. Connected to housings 67 and 68 are a pair of tethering cables 22 and 24, respectively. One of the tethering cables 22 and 24, or both, may include an electrical conductor for transmitting the energy output by generator structure 16 to the ground. If tethering cable 22 or 24 does include an electrical conductor, the housing 67 or 68 to which it is connected must further enclose a slip ring for transmitting energy from the rotating generator structure 16 to the stationary housing 67 or 68.

Of course, another function of cables 22 and 24 is to provide means for retaining the craft 10 at a desired altitude. Cables 22 and/or 24 may consist of a strong material, such as KEVLAR ®, which is a trademark of the Du Pont Company for fibers of an aromatic polyamide comprising the condensation product of p-phenylenediamine with terephthalic acid, or of p-aminobenzoic acid, as an outer insulator for a center conductor, or separate tethering cables and electrical conductors may be provided, as may be desirable. Excess lift provided by the LTA envelope 12 will keep tethering cables 22 and 24 taut and the LTA envelope 12 in the desired wind regime. While a single tethering cable may work as well, the double tethering arrangement illustrated in FIG. 1 is preferred since it will maintain the LTA envelope 12 rigidly in a horizontal position as the system 10 translates downwind and upwind. The cable tethering system illustrated in FIG. 1 allows the structure 12 to translate in the downwind direction when impacted by a gust, thereby relieving the stresses on the system 10. When the gust expires and the lull begins, the restoring force from the lift vector of the envelope 12 will translate the vehicle into the wind thereby regaining the energy of the gust. This feature results in a smoothing of the velocity profile of the wind and, therefore, dramatically smooths the stresses.

The lower ends of the tethering cables 22 and 24 are secured to a mooring system which is indicated generally by reference numeral 26. Although the mooring system 26 could take any of a number of forms, in the preferred embodiment, the mooring system 26 includes an elongated beam 28 which is pivotally coupled at its center point to support pedestal 30 (e.g., concrete) which is affixed in the ground. A pair of mooring stanchions 32 and 34 are provided at the ends of beam 28 to permit the LTA envelope 12 to be secured during bad weather. For this purpose, a pair of winches 36 and 38, or the like, may be provided for drawing in cables 22 and 24, respectively.

The pivoting beam 28 allows the system 10 to be self-orienting without experiencing the undesirable dynamic interaction between the prior art tower and rotor (referred to as "wind shadow"). Since the tethering system requires no tower, "tower shadow" is no problem. The preferred embodiment of the invention achieves aerodynamic damping by the envelope 12 in both pitch and yaw. Self-orientation eliminates the need for yaw motors, yaw dampers, yaw gear preload, ring gears, power to drive the yaw system, and associated inspection, repair and maintenance.

The stanchions 32 and 34 permit the airframe 12 to be rigidly connected to the beam 28 thereby permitting cable inspection, repair and replacement to occur very easily. The loads on the beam 28 when the LTA envelope 12 is drawn down will be substantially identical to the loads when the LTA envelope 12 is aloft.

Referring now to FIG. 2, there is illustrated a longitudinal sectional view of the LTA envelope 12 of FIG. 1. Envelope 12 may be filled with helium, hydrogen or other suitable lighter-than-air gas.

Extending longitudinally along the center axis from the front to the middle section of LTA envelope 12 is a substantially linear hollow duct 40. Extending from the end of duct 40 in the middle section out through the aft end of LTA envelope 12, is a substantially linear spar 41, which helps maintain the duct 40 along the center axis of the envelope 12. The spar 41 also gives shape to the envelope 12 and provides a mount for the tail 14. Due to the preferred location along the neutral axis of LTA envelope 12, duct 40 and spar 41 may be constructed of lightweight material such as aircraft aluminum, glass reinforced plastic, or other fiber-reinforced plastic. Both may be supported, for example, by a plurality of internally secured suspension cables 42 or the like.

The main rotor 18 is positioned in the middle section of LTA envelope 12. In accordance with a preferred embodiment of the invention, the rotor 18 includes multiple hollow rods 52, 53, 54 and 55 connected at a central hub internal to envelope 12 and attached to hollow rotor blades 44, 46, 48 and 50 at the envelope periphery where a plurality of seals 80, 82, 84 and 86 ensure gas-tightness. The hollow rods 52, 53, 54 and 55 and rotor blades 44, 46, 48 and 50 together form air conduits in fluid communication with duct 40. The tips 45, 47, 49 and 51 of blades 44, 46, 48 and 50 are open so as to form air outlets to the atmosphere for exhausting air induced through duct 40. Because rods 52, 53, 54 and 55 are located within envelope 12, they are not exposed to free-stream air flow and therefore do not have to be aerodynamically-shaped. This allows great cost savings over a WECS that has a fully-exposed rotor. The rotor blades 44, 46, 48 and 50 may be designed to articulate to provide feathering features as a method of control. Preferably attached to the ends of rotor blades 44, 46, 48 and 50 are horizontal winglets 72, 74, 76 and 78 which provide additional lift for station keeping. This lift is produced by varying the pitch of winglets 72, 74, 76 and 78 cyclically about their circular flight path, having a positive angle of attack on the upper half of the path. Pitch variance may be controlled through an actuating mechanism which may be either electrical or mechanical.

An air inlet 56 at the front of envelope 12 comprises a ram air inlet to duct 40. Air inlet 56 helps to minimize shear shock to the rotor 18 during sudden wind gusts. That is, the air flow into and out of the system, to be described in greater detail hereinafter, is smoothed, thereby smoothing the loads on the rotor 18. The convergent air inlet 56 increases the velocity of the ram air to a turbine 64 which is located within duct 40. This increase in velocity results in an increase in the pressure differential across the turbine 64 thereby increasing its rotational speed which results in a generator of smaller weight, size and cost.

An electric generator 58 may be mounted in this embodiment forwardly of the turbine 64 and may be held in place by support struts 60 connected to the duct 40. The turbine 64 includes impeller blades 65 which rotate a drive shaft 62 connected to the generator 58. The turbine 64 is preferably a substantially conventional vaneaxial turbine having diffuser guide vanes 66 associated therewith.

In operation, hollow rotor blades 44, 46, 48 and 50, connected to hollow rods 52, 53, 54 and 55, are attached to duct 40. The axial flow extraction turbine 64 is mounted within the duct 40 at the fore portion thereof. The freestream wind will flow around the LTA envelope 12 and through the main rotor 18 causing rotation thereof. Rotation of rotor 18, in turn, causes rotation of the LTA envelope 12 about its longitudinal axis. Duct 40 and spar 41 also rotate within the bearings provided in housings 67 and 68. Tail 14, of course, remains stationary. This arrangement eliminates the need for expensive seals of earlier systems which were required between an internal non-rotating duct and an external main rotor.

The centrifugal forces due to rotation of rotor 18 resulting from the freestream wind causes the air within the hollow blades 44, 46, 48 and 50 to flow out from the tips 45, 47, 49 and 51 thereby inducing a flow through air inlet 56 of hollow duct 40. This flow passes through turbine 64 which, in turn, rotates the generator shaft 62. In this manner, the generator 58 rotates at a high rpm to generate electricity which is transmitted to the ground via cable/conductors 22 and/or 24.

The rotor blades 44, 46, 48 and 50 serve as a diffuser for the turbine 64. It may be appreciated that the elongated duct 40 and hollow blades 44, 46, 48 and 50 require only one 90° turn for the induced air, greatly reducing losses associated with the prior art Enfield-Andreau WECS.

Since the aerodynamic flow as described above replaces the standard mechanical transmission, the weight of the transmission is eliminated. Since the weight of a transmission typically exceeds that of the rotor, hub and associated controls, the present invention represents a substantial weight savings. The size of the duct 40 is preferably small to permit use of a very high speed vaneaxial turbine and associated generator. The high speed generator 58 is rather light when compared to standard generators used for wind turbines. The location and weight of the main rotor diffuser system helps balance the center of gravity of the device 10. The turbine 64 is preferably directly coupled to generator 58 via shaft 62, without requiring step-up gearing, the generator being operated at a synchronous speed with the rest of the power grid.

Referring now to FIGS. 3 and 4, there is illustrated an alternate embodiment of the present invention. In lieu of the first embodiment's hollow bladed diffuser design, this embodiment has small wind-driven generators 88, 90, 92 and 94 with respective propellers 96, 98, 100 and 102 located on the tips of solid main rotor blades 104, 106, 108 and 110. Since the tips of the rotor blades 104, 106, 108 and 110 move faster than any other point on the WECS, this aerodynamically increases the speed of the generators 88, 90, 92 and 94, making it possible to absorb substantially all of the power generated by the main rotor 18.

A single, substantially linear spar 70 extends longitudinally along the center axis through both ends of envelope 12. Spar 70 gives shape to envelope 12 and provides mounts for bearing housings 67 and 68. The envelope 12 is also adapted to rotate with blades 104–110. Electricity is transferred by means of electrical conductors along or inside the rotor blades 104, 106, 108 and 110 and through the internal spar 70 to the tethering cables 22 and 24 attached to bearing housings 67 and 68 via a slip ring arrangement. A non-rotating tail 14 is also mounted on rear bearing housing 68.

The mooring station 26 of the present invention may be located conveniently to the interface to the electrical power grid as long as the winds aloft are of sufficient average strength. Locations of the present invention in a valley, for example, are extremely attractive since same will provide maximum protection to the apparatus when it is retrieved in anticipation of a hurricane, for example. In a worst case storm, the envelope may be deflated. Dramatic savings may be realized with the present invention for off-shore sites that enjoy the most favorable wind regimes. WECS located off-shore may be tethered to anchors, for example, which would be much cheaper than floor-based tower structures. Additionally, off-shore WECS may be towed to their sites and can generate power during the process of towing. Assembly and check out may be accomplished at a shore station prior to towing. Additionally, maintenance, repair and modification may be done at the shore base. Clearly, the design of the present invention will not require structure to oppose the fury of sea waves during storms.

Environmentally, it is by now appreciated that windmills are non-polluting devices that, if reasonably efficient, can greatly assist the energy situation. Although the present invention is quiet compared to other mechanical equipment, the device may be placed high enough so that it would be soundless to personnel on the ground. Aesthetically, the invention is a dramatic improvement over conventional ground-based machines. The high altitudes and thin cables render a degree of near invisibility for personnel at the mooring site, and a reduction in apparent size for distant observers.

It may be appreciated that the present invention provides many solutions to the disadvantages and deficiencies of the prior art WECS. Since the surface-to-volume ratio of gas envelopes becomes more favorable with increased size, and because wind rotors become cheaper per square foot of swept area with increased size, an economical WECS according to the present invention will be quite large. Very large sizes, capable of generating 10 megawatts, may be achieved.

Obviously, numerous modifications and variations of the present invention are possible in light of the above teachings. It is therefore to be understood that within the scope of the appended claims, the invention may be practiced otherwise than as specifically described herein.

I claim as my invention:

1. A buoyant device comprising:
   an envelope filled with a lighter-than-air gas having an longitudinal axis;
   means connected to said envelope for allowing wind-rotation of said envelope about said axis; and
   means supported by said envelope for generating electricity in response to rotation of said envelope.

2. The apparatus as set forth in claim 1, wherein said means for generating electricity includes a main rotor having a plurality of rotor blades adapted to be rotated by the wind.

3. The apparatus as set forth in claim 2, wherein said main rotor is adapted to rotate in a plane which is substantially perpendicular to the longitudinal axis of said structure.

4. The apparatus as set forth in claim 3, further comprising means for orienting said structure, said means comprising a non-rotating tail.

5. The apparatus as set forth in claim 4, further comprising means adapted to be connected between said lighter-than-air structure and the ground for tethering said structure and for delivering electricity.

6. The apparatus as set forth in claim 5, further comprising means for producing additional lift.

7. The apparatus as set forth in claim 6, wherein said lift producing means comprises wings located on said rotor blades in positions substantially parallel to the longitudinal axis of said structure.

8. The apparatus as set forth in claim 7, wherein said means adpated to be connected between said lighter-than-air structure and the ground comprises at least one tethering cable and at least one electrical cable means.

9. The apparatus as set forth in claim 8, further comprising means positioned on the ground for mooring said cable means which includes means for selectively drawing in said cable means and thereby bringing said structure closer to the ground.

10. The apparatus as set forth in claim 9, wherein said cable means includes at least two cables, said mooring means includes a beam pivotally coupled to a support pedestal and having one of said cables connected to each end thereof.

11. The apparatus as set forth in claims 2 or 10, wherein said means for generating electricity further comprises a turbine in fluid communication with said main rotor and an electrical generator coupled to said turbine.

12. The apparatus as set forth in claim 11, wherein said rotor blades are hollow and include air inlets and air outlets.

13. The apparatus as set forth in claim 12, further comprising duct means for communicating said air inlets of said hollow rotor blades to said turbine.

14. The apparatus as set forth in claim 13, wherein said turbine is positioned within said duct means.

15. The apparatus as set forth in claim 14, wherein said duct means includes an open front end and a rear end, and wherein said air inlets of said hollow rotor blades are adapted, upon rotation of said rotor blades, to draw air through said open front end.

16. The apparatus as set forth in claim 15, wherein said turbine includes impeller blade means adapted to be rotated by the air drawn through said open front end of said duct means.

17. The apparatus as set forth in claim 16, wherein said electrical generator is positioned forwardly of said turbine.

18. The apparatus as set forth in claim 17, wherein said duct means comprises a substantially linear duct from said front end to said rear end.

19. The apparatus as set forth in claim 18, wherein said duct means is positioned within said lighter-than-air structure substantially along the longitudinal axis of said structure.

20. The apparatus as set forth in claim 19, wherein said open front end of said duct means comprises a ram air inlet.

21. The apparatus as set forth in claims 2 or 10, wherein said means for generating electricity further comprises generators positioned on said rotor blades.

22. The apparatus as set forth in claim 21, wherein said generators are located on said rotor blades in positions most distant from said envelope.

23. The apparatus as set forth in claim 22, wherein said means for generating electricity further comprises propellers located on said generators.

24. The apparatus as set forth in claim 23, wherein said means for generating electricity further comprises a support spar extending longitudinally through said envelope and radial spar means, and wherein said radial spar means include a periphery and a hub, said periphery connected to said rotor blades and said hub connected to said support spar.

* * * * *